United States Patent
Ito et al.

[11] Patent Number: 5,946,281
[45] Date of Patent: Aug. 31, 1999

[54] LAMINATED PROXIMITY FIELD OPTICAL HEAD AND OPTICAL INFORMATION RECORDING AND REPRODUCING DEVICE

[75] Inventors: Kenchi Ito, Kokubunji; Toshimichi Shintani, Kodaira, both of Japan

[73] Assignee: Hitachi, Ltd., Tokyo, Japan

[21] Appl. No.: 08/913,171

[22] PCT Filed: Aug. 3, 1995

[86] PCT No.: PCT/JP95/00374

§ 371 Date: Sep. 5, 1997

§ 102(e) Date: Sep. 5, 1997

[87] PCT Pub. No.: WO96/27880

PCT Pub. Date: Sep. 12, 1996

[51] Int. Cl.[6] ............................................ G11B 7/00
[52] U.S. Cl. ............................................ 369/112; 369/109
[58] Field of Search ............................ 369/110, 109, 369/103, 112, 44.23, 44.24, 44.14, 44.12

[56] References Cited

U.S. PATENT DOCUMENTS

| 5,121,256 | 6/1992 | Corle et al. . |
| 5,199,090 | 3/1993 | Bell . |
| 5,361,244 | 11/1994 | Nakamura et al. ................ 369/44.12 |
| 5,422,870 | 6/1995 | Kojima et al. ................... 369/44.12 |
| 5,481,386 | 1/1996 | Shimano et al. .................. 369/44.12 |
| 5,583,843 | 12/1996 | Horinouchi ...................... 369/103 |
| 5,602,820 | 2/1995 | Wickramasinghe et al. ........ 369/103 |
| 5,657,304 | 8/1995 | Lehureau ......................... 369/94 |
| 5,751,679 | 5/1998 | Yamakawa et al. ................ 369/103 |
| 5,835,458 | 9/1994 | Bischel et al. ................... 369/44.29 |

FOREIGN PATENT DOCUMENTS

| 5-34129 | 2/1993 | Japan . |
| 5-189796 | 7/1993 | Japan . |

OTHER PUBLICATIONS

U.S. application No. 08/483,989, filed Jun. 7, 1995.
Applied Physics Letters, vol. 61, No. 2, 1992, "Near–field magneto–optics and high density data storage", Betzig et al, pp. 142–144.
Applied Physics Letters, vol. 65, No. 4, 1994, "Near–field optical data storage using a solid immersion lens", B.D. Terris et al, pp. 389–390.
Applied Physics Letters, vol. 63, No. 26, "Fiber laser probe for near–field scanning optical microscopy", Betzig et al, pp. 3550–3552.

*Primary Examiner*—Nabil Hindi
*Attorney, Agent, or Firm*—Fay, Sharpe, Beall, Fagan, Minnich & McKee

[57] ABSTRACT

The present invention provides an optical recording device which is of ultra-high density and is small in size. It comprises a subminiature optical head comprising in turn a semiconductor laser, a photodetector, grating lenses, a cover layer, and a floating slider on which the optical head is mounted. This configuration can provide an optical recording device which is of ultra-high recording density and is subminiature.

9 Claims, 6 Drawing Sheets

REAR FOCUS          IN-FOCUS          FRONT FOCUS

LAMINATED PROXIMITY FIELD OPTICAL HEAD AND OPTICAL INFORMATION RECORDING AND REPRODUCING DEVICE

TECHNICAL FIELD

The invention relates to an optical disk apparatus and an optical information processing device using such an apparatus.

BACKGROUND ART

Attention has been paid so far to an optical disk apparatus as a replaceable medium of a large capacity. However, due to recent progress in the rapid realization of a large capacity magnetic disk apparatus, recording density is almost equal to 1 Gbits/inch$^2$. It seems almost certain that in a few years, the optical disk apparatus will be overtaken by a magnetic disk apparatus in terms of the recording density because of a difference in the progressing speed of the realization of the large capacity. A size of a recording mark in the optical disk apparatus is expressed by the following expression 2.

$$\sigma \approx \frac{\lambda}{NA} \quad \text{[Expression 2]}$$

where, $\gamma$ denotes a wavelength of a laser beam which is used for recording and reproducing, and NA is a numerical aperture which is expressed by NA=sin$\theta$ by using an angle $\theta$ between an optical axis and an optical axis of a light beam which has a maximum angle with the optical axis in a light that is converged by a lens. Therefore, the realization of a high density of the optical disk apparatus has progressed from four directions of a technique for forming a micro information recording mark and a technique for accurately reproducing an information recording mark smaller than a diameter of a light spot, by using the realization of a short wavelength of a semiconductor laser beam and the realization of a high NA of a condenser lens as centers. As for the first approach, in recent years, there are epoch-making advancements such as continuous oscillation at room temperature of a green laser by a semiconductor of the II–VI groups, production of a blue light emitting diode by a semiconductor of the III–V groups of the gallium nitrogen system, and the like. As for the third and fourth approaches as well, the progress is steadily being performed. However, even if they are integrated, it is presumed that the recording density can be improved by at most about one order of magnitude. A fundamental cause is because the light cannot be reduced than a wavelength of light due to a diffraction phenomenon of the light.

As a method of improving the recording density by two orders of magnitude as compared to the present situation by breaking such a limitation, attention is paid to an optical recording and reproducing method using a proximity field (evanescent field). For instance, as disclosed in Applied Physics Lettes, Vol. 61, No. 2, pp. 142–144, 1992, there has been reported an example in which a probe constructed in a manner such that a tip of an optical fiber is worked into a conical shape and regions other than a region of tens of nm of the tip are covered by a metal coating film is manufactured, the probe is mounted in a precision actuator which uses a piezoelectric element, a position is controlled, and a recording mark having a diameter of 60 nm is recorded and reproduced onto/from a multilayer film of platinum/cobalt. In case of the above example, the recording density reaches 45 Gbits/inch$^2$ and can be increased to about 50 times as high as the present one. More recently, in Applied Physics Lettes, Vol. 65, No. 4, pp. 388–390, 1994, there has been reported an example in which, by effectively raising the numerical aperture NA by using a solid immersion lens (hereinafter, abbreviated to SIL) shown in FIG. 2, 40 Gbits/inch$^2$ can be accomplished in principle.

DISCLOSURE OF INVENTION

The above conventional example, however, has the following problems.

First, in the first example using the optical probe, it can be pointed out that a signal level is low.

In the above first conventional example, a detecting power is only about 100 nW which is extremely small and it is not on the level which can be used in the optical disk apparatus. To improve it, for example, in Applied Physics Lettes, Vol 63, No. 26, pp. 3550–3552, 1993, an output of 0.3 mW can be obtained for a gold reflecting film by an input of 45 mW by using a fiber laser of Nd doping. However, since the fiber laser is used, a problem such that a resonance frequency is as small as 92 kHz and information cannot be transferred at a high speed has occurred.

According to the second conventional example using the SIL, on the other hand, a conventional optical system can be used as it is for portions other than the SIL, and a conventional system can be also used as a detecting system of a reproduction signal and a servo signal. Unlike the first conventional example, therefore, fundamental performances such as signal level, transfer speed, and the like are similar to those of the conventional optical disk apparatus. As shown in FIG. 2, however, it is necessary to mount a spherical SIL 21 in extremely close vicinity to a medium and, first, there is a problem such that it is difficult to align the positions of an objective lens 22 and SIL 21 in registration. Second, since a diameter of the SIL is extremely small (0.3 mm), there is a problem as to its mounting method. Third, the SIL needs to be mounted as extremely close as about 100 nm to an optical recording medium 23 and hence a conventional focusing servo method cannot be used. There is, consequently, a problem such that a driving mechanism which does not need a focusing servo is necessary.

To solve the above problems, the following means are taken in the present invention.

First, there is provided an optical head constituted of: a substrate; a semiconductor laser formed over the substrate, or in the substrate, or in contact with the substrate; a lens for converging a light emitted from the semiconductor laser; branching means for branching a light, which enters the lens from the side opposite to the semiconductor laser and is conjugate to the converged light, to a position different from the semiconductor laser; and a photodetector for receiving the light branched by the branching means, characterized in that the lens is made up of at least two or more lenses and a high refractive index material into which the lens is buried, and the lens system is designed in a manner such that the maximum value of an angle between a light beam which is converged by the lens and an optical axis is larger than an angle of total reflection at an interface between the high refractive index material and the air. Further, the condenser lens is formed by a grating lens.

Further, a gap between a resonator mirror on the emitting side of the semiconductor laser of the optical head and the condenser lens is filled with a transparent material, thereby forming an integral structure. Or, a semiconductor laser of an area light emitting type in which a resonator is formed in the direction perpendicular to the substrate is used as a semiconductor laser.

Moreover, a diameter of the condenser lens of the optical head is set to 1 mm or less. In addition, in the optical head, a ceramics film is coated on the surface on the light emitting side.

Furthermore, in the optical head, denoting the maximum value of the angle between the light beam which is converged by the lens and the optical axis as θmax and the wavelength of the semiconductor laser as γ and the refractive index of the high refractive index material as n, the optical recording medium is disposed in a range of a distance d shown by an expression (1) from the high refractive index material.

Further, the optical head is mounted on a floating slider. Or, the optical head itself is used as a floating slider.

Further, an optical information recording and reproducing device comprising the optical head, floating slider mentioned above, and optical information recording medium, is constructed.

Moreover, the optical recording medium, laminated proximity field optical head, actuator for moving the optical head, and casing for enclosing them therein and shutting off from the outside air are arranged as a detachable, integral unit.

The above means functions as follows.

In the optical head constituted of: the substrate; the semiconductor laser formed over the substrate, or in the substrate, or in contact with the substrate; the lens for converging the light emitted from the semiconductor laser; the branching means for branching the light which enters the lens from the side opposite to the semiconductor laser and is conjugate to the converged light to the position different from the semiconductor laser; and the photodetector for receiving the light branched by the branching means, the lens is made up of at least two or more lenses and the high refractive index material into which the lens is buried, and the lens system is designed in a manner such that the maximum value of an angle between a light beam which is converged by the lens and an optical axis is larger than an angle of total reflection at an interface between the high refractive index material and the air. In particular, the condenser lens is formed by a grating lens and can be manufactured by using a semiconductor processing technique, thereby resulting in advantages that an effect of improving the NA that is equal to that of the SIL is obtained, the position alignment work of the lens system is made unnecessary, and the mounting operation is made extremely easy.

Further, the gap between the resonator mirror on the emitting side of the semiconductor laser of the optical head and the condenser lens is filled with the transparent material, thereby forming an integral structure. Also, the semiconductor laser of the area light emitting type in which a resonator is formed in the direction perpendicular to the substrate is used as the semiconductor laser. Thus, all of the optical parts are laminated and formed in a lump onto the substrate on which the semiconductor laser is formed. The position alignment work of all of the optical parts is also made unnecessary and a remarkable miniaturization of the optical head can be realized.

Moreover, the diameter of the condenser lens of the optical head is set to 1 mm or less, thereby remarkably reducing a working error and an adjusting error of the lens for an aberration and enabling the grating lens to be actually used.

Furthermore, in the optical head, denoting the maximum value of the angle between the light beam which is converged by the lens and the optical axis as θmax, the wavelength of the semiconductor laser as γ and the refractive index of the high refractive index material as n, the optical recording medium is disposed in a range of a distance d shown by an expression (1) from the high refractive index material. Thus, transmitting efficiency of the evanescent light is raised and a smaller light spot can be obtained.

$$d \leq \lambda / \{2\pi\sqrt{(n^2\sin^2\theta\max - 1)}\} \ldots \qquad \text{(expression 1)}$$

By realizing the ultra-small laminated optical head as mentioned above, the optical head can be mounted on the slider. Thus, the focusing servo can be made unnecessary.

BEST MODE FOR CARRYING OUT THE INVENTION

An embodiment of the invention will now be described hereinbelow with reference to the drawings.

Figure 1:
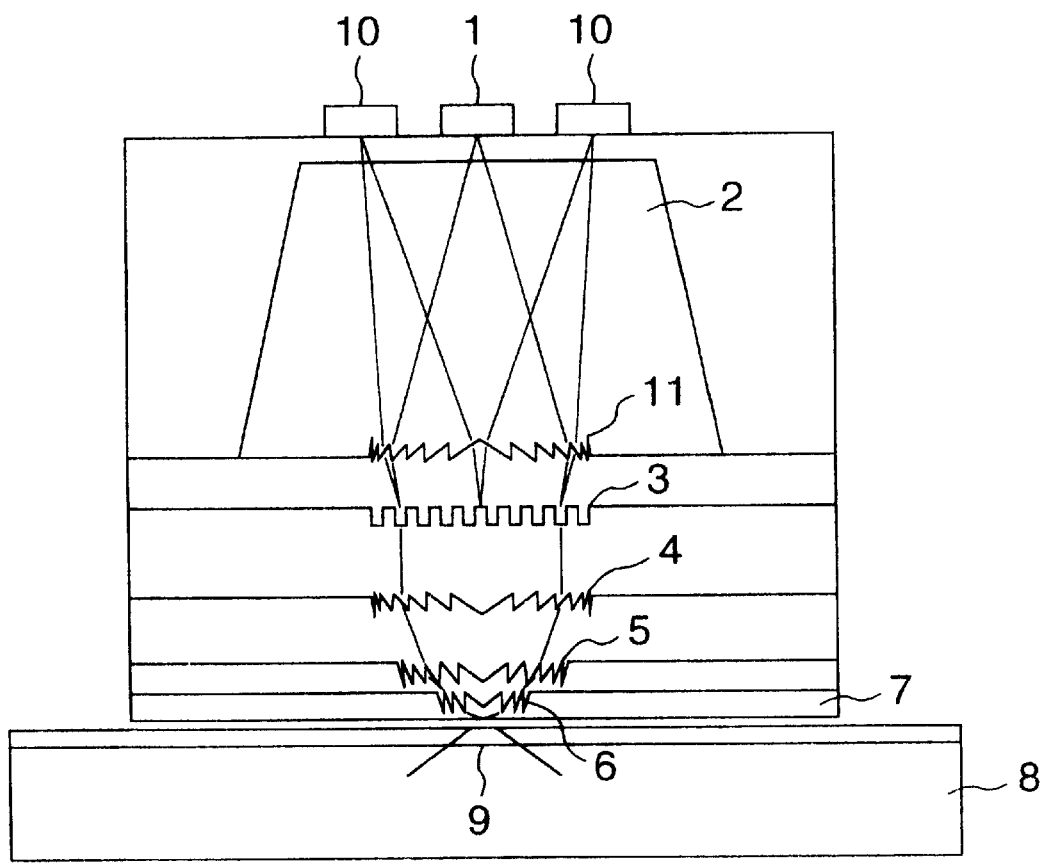
FIG. 1 is a cross sectional view showing an embodiment of the invention.

FIG. 1 shows a first embodiment of the invention. A laser beam emitted from an area light emitting laser 1 enters a packed layer 2, is collimated by a collimator lens 11, and transmits through a grating element 3 made of another material having a different refractive index. Thus, although a small quantity of light is diffracted, it is unnecessary. The light transmitted through the grating is diffracted by first and second grating lenses 4 and 5. After that, it is further converged by a third grating lens 6. At this time, the maximum angle Omax between the optical axis and the converged light is set to a value larger than the angle of total reflection at an edge surface of a cover layer 7. The edge surface of the cover layer 7 is set to a focal position of the lens system. Further, when the optical recording medium 8 is arranged in a proximity field region that is slightly away from the edge surface of the cover layer 7, not only the light entering at an angle which is equal to or less than a total reflection angle θc but also a part of the light entering at an angle which is equal to or larger than θc transmit, the NA effectively increases, and the light is converged to a smaller spot 9. The reflection light from the optical recording medium 8 again transmits through the lens systems 4, 5, and 6, is diffracted by the grating element 3, and is converged onto a photodiode 10 provided adjacently to the area light emitting laser 1, and a reproduction signal and a servo signal are detected.

The operation of the embodiment 1 will now be further described in detail hereinbelow with reference to FIG. 2. Comparison between the operations of the SIL of the embodiment and the conventional SIL shown in FIG. 2(a) are shown in FIG. 2(b).

According to the conventional SIL, the SIL 21 is disposed at a position near a converging point of the objective lens 22. Here, the NA of the objective lens 22 is denoted as NA=$\sin\theta$O. The refractive index of the SIL 21 is denoted as n and a radius is denoted as r. Further, a lower portion of the SIL 21 is polished and cut up to the position of a length r/n from the center. The center of the SIL 21 is set to the position of nr from the focal position of the objective lens 22. In this instance, the converged light is refracted at the SIL surface and is converged to one point of a polished surface 23. Now, denoting an angle of incidence as $\theta_1$ and an angle of refraction as $\theta_2$, the equation $\sin\theta_1 = n\cdot\sin\theta_2$ holds true by Snell's rule. $\theta_2 = \theta$O and $\theta_1 = \theta$max are obtained due to the similarity of triangles. Therefore, a spot diameter is expressed as shown by the following expression 3.

$$\sigma \approx \frac{\lambda/n}{n\sin\theta_0} \qquad \text{[Expression 3]}$$

Thus, the NA is effectively increased by n times and, further, the spot diameter becomes $1/n^2$. Now assuming that $\lambda$=780 nm and NA and n of the objective lens 22 are set to NA=0.5 and n=1.9, the effective NA is equal to 0.95 and a spot diameter $\sigma$=430 nm, which is equal to about 1/3.6 as compared with that in the case where no SIL is used. However, in this state, since the light entering at an of total reflection angle $\theta c = \sin^{-1}(1/n)$ or more cannot transmit, by arranging the optical recording medium 8 into the proximity field region of the SIL, the light entering at an angle of $\theta c$ or more can be also taken out.

On the other hand, in the grating lens used in the embodiment, (FIG. 2(b), the NA is mainly determined by the period of the gratings. For example, if it is assumed that the first grating lens converts a plane wave to a spherical wave, and denoting its focal distance as f1 and a refractive index of the cover layer 6 as n1, a period of the mth groove from the center is approximately expressed by the following expression 4.

$$\Lambda_m = \sqrt{\frac{\lambda f_1}{2mn_1}} \qquad \text{[Expression 4]}$$

In the embodiment, now assuming that the lens diameter is set to 0.1 mm, $\lambda$=780 nm, NA=0.5, and n1=1.5, since f1=0.086 mm, the minimum period of the groove of the lens is set to 890 nm. This value is a period at which the device can be manufactured by an ordinary lithographic process.

Subsequently, denoting a distance between the second grating lens and the first grating lens as a and a focal distance of the two lens systems of the first and second grating lenses as f2, the period of the mth groove from the center is approximately expressed by the following expression 5.

$$\Lambda'_m = \sqrt{\frac{\lambda f_2}{2mn_1} / \left(\frac{1}{b} - \frac{1}{f_1 - a}\right)} \qquad \text{[Expression 5]}$$

Now, assuming that a=0.04 mm and f2=0.024 mm, the period of the smallest groove of the lens is equal to 680 nm and is a period at which the device can be manufactured by the ordinary lithographic process. Further, if the distance between the third grating lens and the second grating lens is denoted as b and the focal distance of the synthesized lens comprising the three grating lenses is denoted as f3 and a refractive index of the top cover layer is denoted as n2, the period of the mth groove from the center is similarly expressed by the following expression 6.

$$\Lambda''_m = \sqrt{\frac{\lambda f_3}{2mn_2} / \left(\frac{1}{c} - \frac{1}{f_2 - b}\right)} \qquad \text{[Expression 6]}$$

Now assuming that b=0.02 mm and f3=0.02 mm and n2=1.9, the period of the smallest groove of the lens is equal to 550 nm and is a period at which the device can be manufactured by the ordinary lithographyic process. The synthesized NA is equal to 0.91 and the spot diameter is equal to 450 nm, which is almost equal to that in case of using a conventional SIL. Namely, in the embodiment, the NA and spot diameter which are equivalent to those in the case of using the SIL are realized by using two grating lenses which can be actually manufactured.

In the embodiment, there are the following advantages as compared with the system using a conventional SIL. In the ordinary SIL as mentioned above, the spherical lens has to be polished to the distance of r/n from the center. A range where, even if a focal deviation $\Delta z$ exists, a enough good image is derived, (namely, a focal depth), is given by the following expression 7 according to, for instance, "Optical Disk Technique", editad by Morio Onoue, Radio Gijutsu Co., Ltd., page 60.

$$\Delta z \leq \frac{2\sqrt{3}}{7} \frac{\lambda}{(NA)^2} \qquad \text{[Expression 7]}$$

In the lens system of the above example using the SIL, since the NA is as extremely large as 0.95, $\Delta z$ is as remarkably small as $\Delta z$=430 nm. However, it is quite difficult to match the dimensions of the spherical lens with a size within such a range by polishing. A position registration precision of the objective lens and the SIL is also almost at this level. It is also extremely difficult to perform the position registration and, further, to mount and fix the objective lens and the SIL after completion of the position registration. On the other hand, according to the embodiment, although $\Delta z$ is as quite small as $\Delta z$=450 nm, upon manufacturing, it is sufficient to grow the cover layer 6 up to 2 $\mu$m by a thin film growing method such as a CVD method or the like. According to the thin film growth, the control of 100 nm is easy and the surface position of the cover layer 6 can be sufficiently set into the focal depth. As for the distances of 86 $\mu$m and 20 $\mu$m of the three grating lenses, these distances can be grown by a proper thick film growing apparatus and the mutual distances can be controlled at an extremely high precision.

The above construction has a feature such that the working error and adjusting error of the lens regarding the aberration can be relatively reduced. To reduce the lens diameter with the NA held constant corresponds to reducing the optical system similarly. When the optical system is reduced, the aberration also similarly decreases. However, since the wavelength of light which is transmitted there is not reduced, an aberration amount for the wavelength is decreased by only such a magnification. Since an allowable aberration amount of the optical system is ordinarily determined by the wavelength, allowable amounts of the working error and adjusting error of the lens can be also increased.

For example, in the embodiment, since the light of a $1/e^2$ half width, about 10°, emitted from the area light emitting laser 1 is collimated by the collimator lens existing at the position of a distance of 0.284 mm from the laser, the diameter of the beam is equal to 0.1 mm, which is equal to or less than 1/10 of that of the ordinary optical system and it is considered that the above effect is remarkable. For easy understanding, consideration will now be made with respect to the first grating lens 4. Now, denoting the height of an incident light beam as h, a spherical aberration W of the grating lens is given by the following expression 8.

$$W = Ah^4 \qquad \text{[Expression 8]}$$

Here, let us consider the so called "color aberration" in association with a fluctuation of the wavelength of the incident light beam, which particularly causes a problem. In the case where the wavelength changes from $\lambda$ to $\lambda+\Delta\lambda$, the expression 8 is changed to the following expression 9.

$$W = \frac{1}{4}(NA)^3 \frac{\Delta\lambda^4}{\lambda^2} h \qquad \text{[Expression 9]}$$

Since the wavelength fluctuation amount of the semiconductor laser is generally equal to 5 nm, in the embodiment, it is equal to $0.013\lambda$ for the maximum light beam height h=0.05 mm and such a value is an aberration amount in which it can be sufficiently used for the optical recording device. The same shall also apply to another aberration such as a coma aberration or the like occurring due to an inclination of the light beam from the optical axis and indicates that the present optical system has large allowable amounts of the working error and adjusting error.

Figure 3:
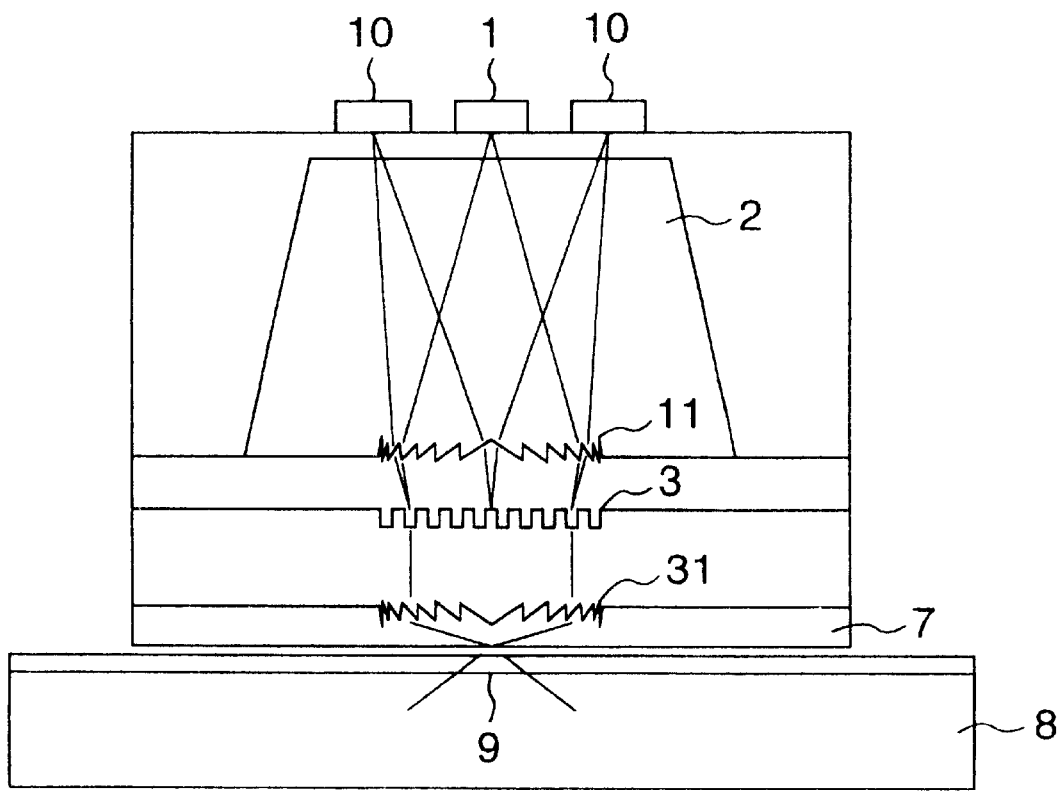
FIG. 3 shows another embodiment of the invention.

FIG. 3 shows a second embodiment of the invention. In the invention, the three grating lenses in the first embodiment are constructed by one grating lens 31 (focal distance is equal to 0.02 and the NA is equal to 0.90) and the cover layer 6 of a thickness of about 20 μm is manufactured on the lens 31 by a thick film forming method. Since the minimum period of the grating lens is set to 208 nm and it is difficult to manufacture such a lens by a photo lithographic technique, it is manufactured by using a electron beam lithographying method. Therefore, although the embodiment 1 can be easily realized from a viewpoint of a throughput as long as the present state of the art in the working or machining technique is concerned, if a throughput of the electron beam lithographic method is remarkably improved, the embodiment 2 is a simpler construction and it is presumed that its advantages will be largely derived.

According to the embodiment above, although the area light emitting type semiconductor laser has been used, the ordinary edge surface light emitting type semiconductor laser can be also used. As for the semiconductor laser and the photodetector, even in case of the conventional system in which descrete parts are mounted, the above effect is not changed.

Figure 4:
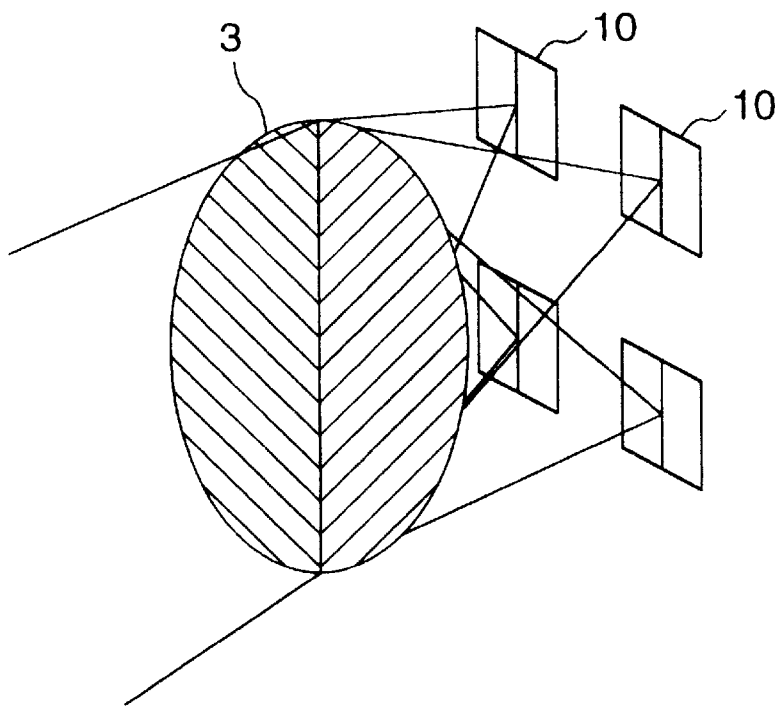
FIG. 4 shows an example of a diffraction grating for generating a focusing deviation signal and a tracking deviation signal.

FIG. 4 shows a conceptual example of the grating 3 and photodiode 10 for detecting various signals. The grating 3 is a rectilinear diffraction grating in which both sides are inclined at 45° around the center line as a boundary and mutually cross perpendicularly. The photodiode 10 is arranged at four positions so as to receive the ±primary beams from each of the diffraction gratings on both sides of the reflection light from the optical recording medium. Each photodiode is further divided into two portions in the dividing direction and vertical direction of the grating. Further, the dividing line is arranged in the direction that is parallel with the recording grooves of the recording medium.

Figure 5:
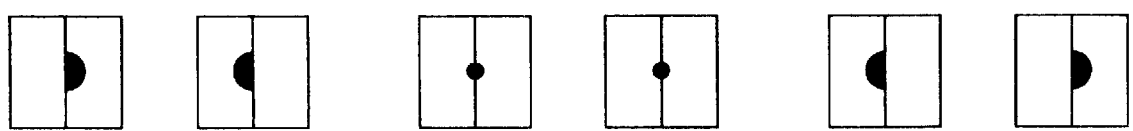
FIG. 5 is a diagram showing a focusing deviation signal.
Figure 5:
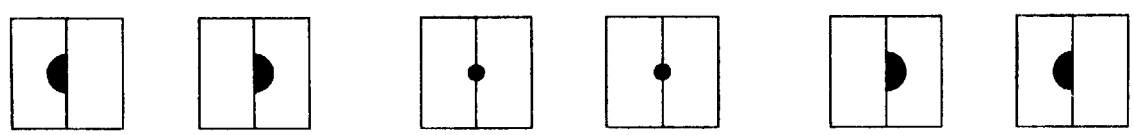

FIG. 5 shows an example of a detection of a focusing deviation by the photodiode. Light distributions at the time of a rear focus, an in-focus, and a front focus of the light which enters the four detectors are shown. A focusing deviation signal can be detected by obtaining a difference between outputs of the 2-split photodiodes for each of the 4-split detectors. The adjusting precision of the photodiode, which causes a significant problem in case of assembling conventional bulk optical parts, can sufficiently be dealt with in the direction perpendicular to the optical axis by the precise positioning of a photomask in the embodiment, and the adjusting precision in the optical axial direction can be dealt with by a precise film thickness control of a thin film or thick film. Therefore, the troublesome position adjustment of parts as in the conventional device is unnecessary.

The tracking deviation signal is obtained from an unevenness of the diffraction light distributions from the grooves of the optical recording medium. That is, a difference between the amounts of light entering the gratings 3 on both of the right and left sides is obtained.

Figure 6:
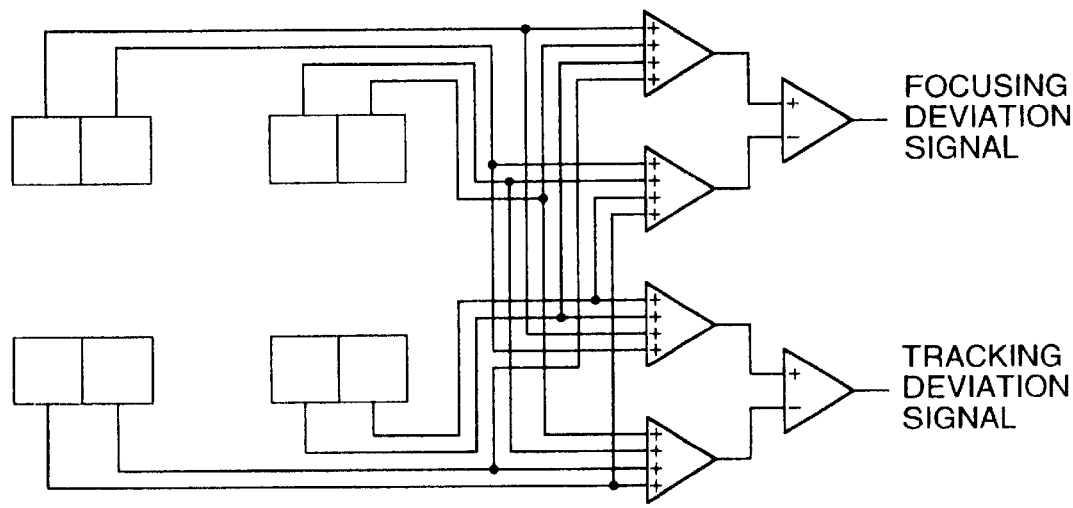
FIG. 6 is a diagram showing a generating circuit of the focusing deviation and tracking deviation signals.

FIG. 6 shows a manufacturing method of the focusing deviation signal and the tracking deviation signal. The tracking deviation signal is obtained as a difference between the sum of two signals on the left side of the upper stage, in the diagram and two signals on the right sides of the lower stage, and the sum of two signals on the left side of the lower stage and two signals on the right sides of the upper stage.

In the case where the optical recording medium is a ROM medium such as a compact disc or a phase change medium, the total of the outputs from all of the photodiodes is used as a detection signal.

Figure 7:
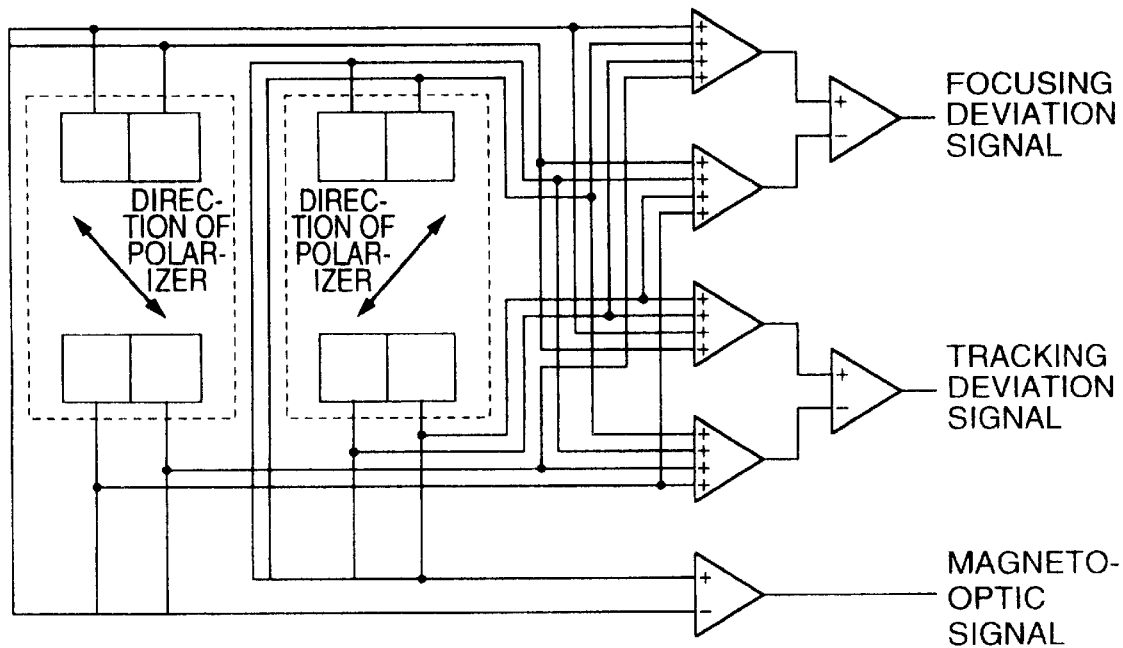
FIG. 7 is a diagram showing a signal detecting circuit for a magneto-optic detection.

In case of detecting a magnetooptic signal, a circuit is further constructed as shown in FIG. 7. That is, polarizers having transmitting polarizing directions inclined at ±45° from a polarizing direction 71 of the area light emitting laser 1 are adhered onto the photodiodes. The signal can be detected by deriving a difference between the sums of the outputs of the split photodiodes arranged under the polarizers.

Figure 2:
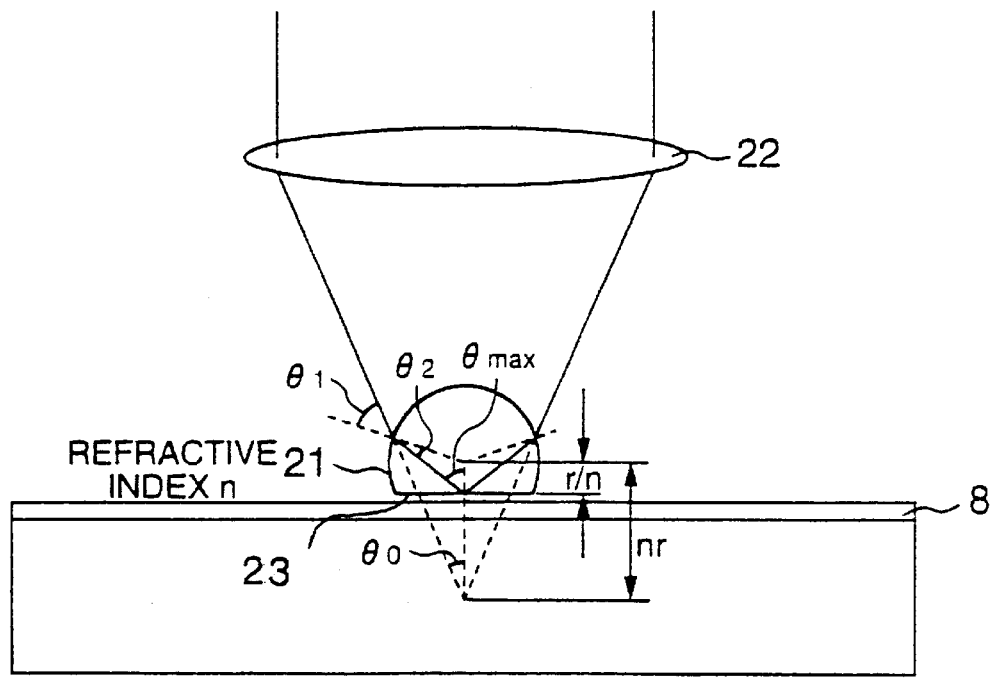
FIG. 2 is a diagram for comparing the operations of a lens system which is used in the invention and a conventional SIL.
Figure 2:
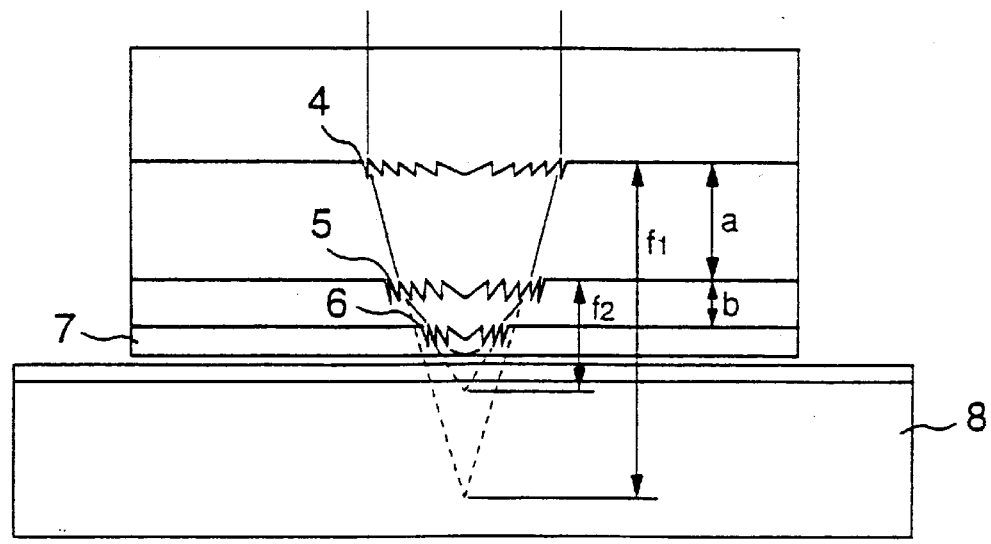

The embodiment largely differs from FIG. 2(*a*) of the conventional example with respect to another point, in that the size of the optical head is extremely small. That is, in the embodiment, the optical head has a size of merely 0.4 to 0.5 mm from the area light emitting laser 1 to the cover layer 7. Therefore, the optical head shown in FIG. 1 can be inserted into a casing and can be mounted onto the floating slider.

Figure 8:
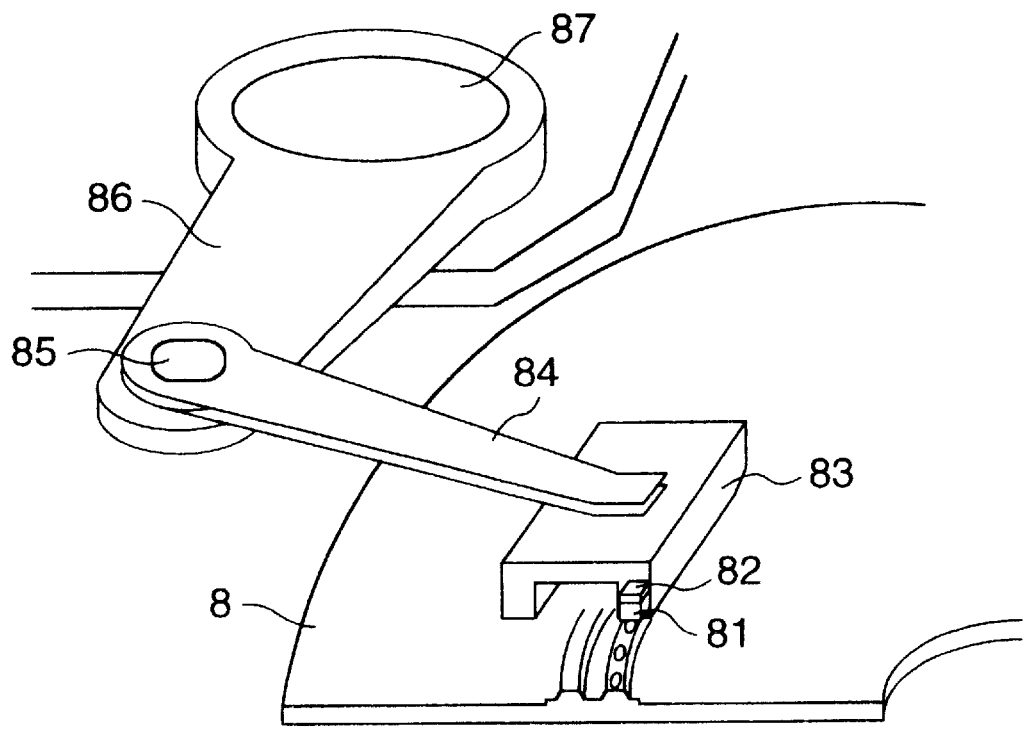
FIG. 8 is a diagram showing a position matching and accessing mechanical system of the invention.

FIG. 8 shows an example in which the laminated optical head of the invention is mounted on the floating slider. Reference numeral 81 denotes a laminated optical head of the invention; 82 a driving element to finely adjust a distance between the optical head and the optical recording medium upon mounting; 83 a slider for a magnetic disk; 84 and 85 arms for supporting; 86 a driving mechanism for finely moving the arms in the track direction of the optical recording medium; 87 a head swing arm; and 88 a driving mechanism to access the slider. As mentioned above, in the optical head of the invention, a focal depth is at most about ±200 nm. Since a flying height in today's typical magnetic disk apparatus is about 70 to 80 ±10 nm, the optical head can be sufficiently floated while being held in the focal depth. Unlike magnetic heads, however, since the optical head is not buried in the magnetic slider, it is difficult to expose the head surface by polishing. In the embodiment, therefore, the optical head 81 is mounted on a driving mechanism having a resolution of about ±10 nm, for example, on the piezoelectric element 82. Upon driving of the apparatus, the flying height is finely adjusted by using the focusing deviation detection signal, thereby holding the optical head position in the focal depth. After the position control is once finished, the position of the optical head is held within a fluctuation of +10 nm or less by the floating of the slider and there is no need to dynamically correct the focusing deviation. The tracking operation of the optical head is performed by a driving mechanism 86 by using the tracking deviation detection signal. The reason why the driving system similar to such a simple magnetic disk is used is that the optical head of the embodiment is a small and light-weight optical head which is laminated in a lump, which is a feature not derived by the optical head using the conventional SIL.

Figure 9:
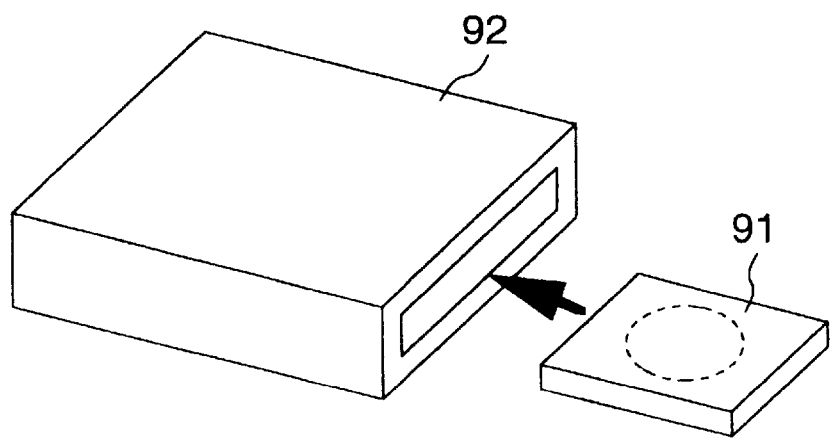
FIG. 9 is a conceptual diagram of a driving apparatus on which an optical head and a mechanical system of the invention are mounted.

FIG. 9 shows an embodiment of a disk package having therein the optical head and a tracking actuator. The optical head, slider, and tracking access driving mechanism are enclosed in a box 91 which shuts off the inside from the outside air. A power input terminal and a signal terminal are provided for the outside of the box. By inserting the box 91 into a recording and reproducing device 92, information is recorded or reproduced. By using a sealed structure similar to the magnetic disk apparatus, a cover glass is made unnecessary, dust is shut off, and a proximity field floating type optical disk apparatus can be realized.

According to the invention as mentioned above, even if a complicated signal processing and optical recording medium structure is not used, a bit pitch of 400 nm, a track pitch of 400 nm, and an area recording density of 4 Gbits/inch$^2$ can be accomplished by using the present semiconductor laser of a wavelength of 780 nm. By using a future blue light source, 16 Gbits/inch$^2$ which is four times as high as the conventional one can be further accomplished. In the embodiment, although the glass layer of a refractive index of 1.9 is used as a cover layer, for instance, if a semiconductor of the II–VI groups having a refractive index of about 2.5 is used, since the spot diameter is inversely proportional to the refractive index of the cover layer, the recording density can be further raised to 28 Gbits/inch$^2$. According to the invention as mentioned above, by increasing the refractive index of the cover layer, a further higher density can be attained. In the conventional SIL, since the spherical lens 21 needs to be formed and an upper limit of the refractive index of a saltpeter material of glass is equal to about 19, it is fairly difficult to use a higher refractive index substance than it.

With respect to this point as well, there is a larger advantage as compared with the optical head using the conventional SIL.

INDUSTRIAL APPLICABILITY

As mentioned above, according to the invention, the optical head for the optical recording device of a ultra-high recording density can be miniaturized, it can be mounted on the floating slider, and the optical recording apparatus in which it is unnecessary to adjust the focusing deviation can be constructed.

We claim:

1. A laminated proximity field optical head comprising:
   a substrate;
   a semiconductor laser formed over said substrate, or in said substrate, or in contact with said substrate;
   a condenser lens for converging a light emitted from said semiconductor laser;
   branching means for branching a light which enters said condenser lens from the side opposite to said semiconductor laser and is conjugate to said converged light to a position different from said semiconductor laser; and
   a photodetector for receiving the light branched by said branching means;
   wherein condenser lens is buried with a high refractive index material, and a maximum value of an angle between a light beam which is converged by said condenser lens and an optical axis of said condenser lens is larger than an angle of total reflection at an interface of said high refractive index material and the air;
   wherein said condenser lens is made up of grating lenses; and
   wherein said high refractive index material is disposed on the opposite side to the semiconductor laser with respect to the grating lenses.

2. A laminated proximity field optical head according to claim 1, wherein a gap between a resonator mirror on the emitting side of said semiconductor laser and said condenser lens is filled with a transparent material, thereby forming an integrated structure.

3. A laminated proximity field optical head according to claim 1, wherein said semiconductor laser is a semiconductor laser of an area light emitting type in which a resonator is formed in the direction perpendicular to said substrate.

4. A laminated proximity field optical head according to claim 1, wherein a diameter of said condenser lens is set to 1 mm or less.

5. A laminated proximity field optical head according to claim 1, wherein a ceramics film is coated on the surface on the light emitting side.

6. An optical recording and reproducing device for accessing an optical recording medium by a laminated proximity field optical head which comprises a substrate, a semiconductor laser formed over said substrate, or in said substrate, or in contact with said substrate, a lens for converging a light emitted from said semiconductor laser, branching means for branching a light which enters said lens from the side opposite to said semiconductor laser and is conjugate to said converged light to a position different from said semiconductor laser, and a photodetector for receiving the light branched by said branching means and which is characterized in that said lens is buried with a high refractive index material and a maximum value of an angle between a light beam which is converged by said lens and an optical axis is larger than an angle of total relection at an interface of said high refractive index material and the air,
   wherein said optical recording and reproducing device is characterized in that, denoting the maximum value of the angle between the light beam which is converged by said lens and the optical axis as θmax, a wavelength of said semiconductor laser as λ and a refractive index of said high refractive index material as n, said optical recording medium is disposed in a range of a distance d shown by the following expression from said high refractive index material:

$$d \leq \frac{\lambda}{2\pi\sqrt{n^2\sin^2\theta_{max}-1}}.$$

7. An optical recording and reproducing device according to claim 6, characterized in that said laminated proximity field optical head is mounted on a floating slider.

8. An optical recording and reproducing device according to claim 6, characterized in that said laminated field proximity optical head itself is used as a floating slider.

9. An optical information recording and reproducing device according to claim 6 characterized in that said optical recording medium, said laminated proximity field optical head, an actuator for moving said optical head, and a box for enclosing said optical recording medium, said laminated proximity field optical head, and said actuator therein and shutting off from outside air are detachable as an integral unit.

* * * * *

UNITED STATES PATENT AND TRADEMARK OFFICE
CERTIFICATE OF CORRECTION

PATENT NO. : 5,946,281                                        Page 1 of 1
DATED : August 31, 1999
INVENTOR(S) : K. Ito et al.

It is certified that error appears in the above-identified patent and that said Letters Patent is hereby corrected as shown below:

<u>Title page,</u>
Item [22] please change "[22] PCT Filed: August 3, 1995" to -- [22] PCT Filed: March 8, 1995 --.

Signed and Sealed this

Fourteenth Day of May, 2002

Attest:

JAMES E. ROGAN
*Attesting Officer*          *Director of the United States Patent and Trademark Office*